United States Patent
Plaideau et al.

(10) Patent No.: US 8,331,119 B2
(45) Date of Patent: Dec. 11, 2012

(54) SUPPLY CIRCUIT FOR A MOTOR DISPOSING OF AN ELEMENT PROVIDING FOR POWER SWITCHING, A PROTECTION AGAINST POLARITY INVERSION AND AN ELEMENT FOR LIMITING THE INRUSH CURRENT OF A CAPACITIVE ELEMENT

(75) Inventors: Michel Plaideau, Presles (FR); Mickael Tihy, St. Etienne (FR)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 714 days.

(21) Appl. No.: 12/373,992

(22) PCT Filed: Jul. 20, 2007

(86) PCT No.: PCT/FR2007/001247
§ 371 (c)(1),
(2), (4) Date: Oct. 28, 2009

(87) PCT Pub. No.: WO2008/009827
PCT Pub. Date: Jan. 24, 2008

(65) Prior Publication Data
US 2010/0045257 A1    Feb. 25, 2010

(30) Foreign Application Priority Data
Jul. 21, 2006   (FR) ..................... 06 06653

(51) Int. Cl.
*H02M 7/5387* (2007.01)
*G05F 1/00* (2006.01)

(52) U.S. Cl. ....................... 363/132; 323/266

(58) Field of Classification Search ............... 323/266; 363/132
See application file for complete search history.

(56) References Cited

U.S. PATENT DOCUMENTS

| 4,763,049 | A | * | 8/1988 | Magee ................ 318/400.27 |
| 5,635,804 | A | * | 6/1997 | Tanaka et al. ............... 318/139 |
| 7,813,152 | B2 | * | 10/2010 | Noda et al. ................ 363/132 |
| 2003/0179034 | A1 | * | 9/2003 | Melis et al. .................. 327/427 |
| 2007/0114981 | A1 | * | 5/2007 | Vasquez et al. .............. 323/266 |

FOREIGN PATENT DOCUMENTS
EP    1 349 255 A2   10/2003

OTHER PUBLICATIONS
International Search Report with translation from PCT/FR2007/001247 dated May 29, 2008 (4 pages).

* cited by examiner

*Primary Examiner* — Adolf Berhane
*Assistant Examiner* — Gary Nash
(74) *Attorney, Agent, or Firm* — Osha Liang LLP

(57) ABSTRACT

Supply circuit (3) for an electric apparatus (1) having a positive supply line (5) and a negative supply line, to which lines a polarity inversion detection module (18), an inrush current module (18) and a capacitive filter element (14) are connected, wherein the capacitive filter element is mounted on a secondary line (15), the ends of which are connected to the positive and negative line, respectively; the circuit comprising a first MOSFET transistor (16) channel N and a second MOSFET transistor (17) channel N mounted in series on the positive line, wherein the first transistor has a gate which is connected to the inrush current detection module and the second transistor has a drain which is connected to the positive line prior to the point of connection between the positive line and the secondary line and a gate which is connected to the polarity inversion detection module.

4 Claims, 1 Drawing Sheet

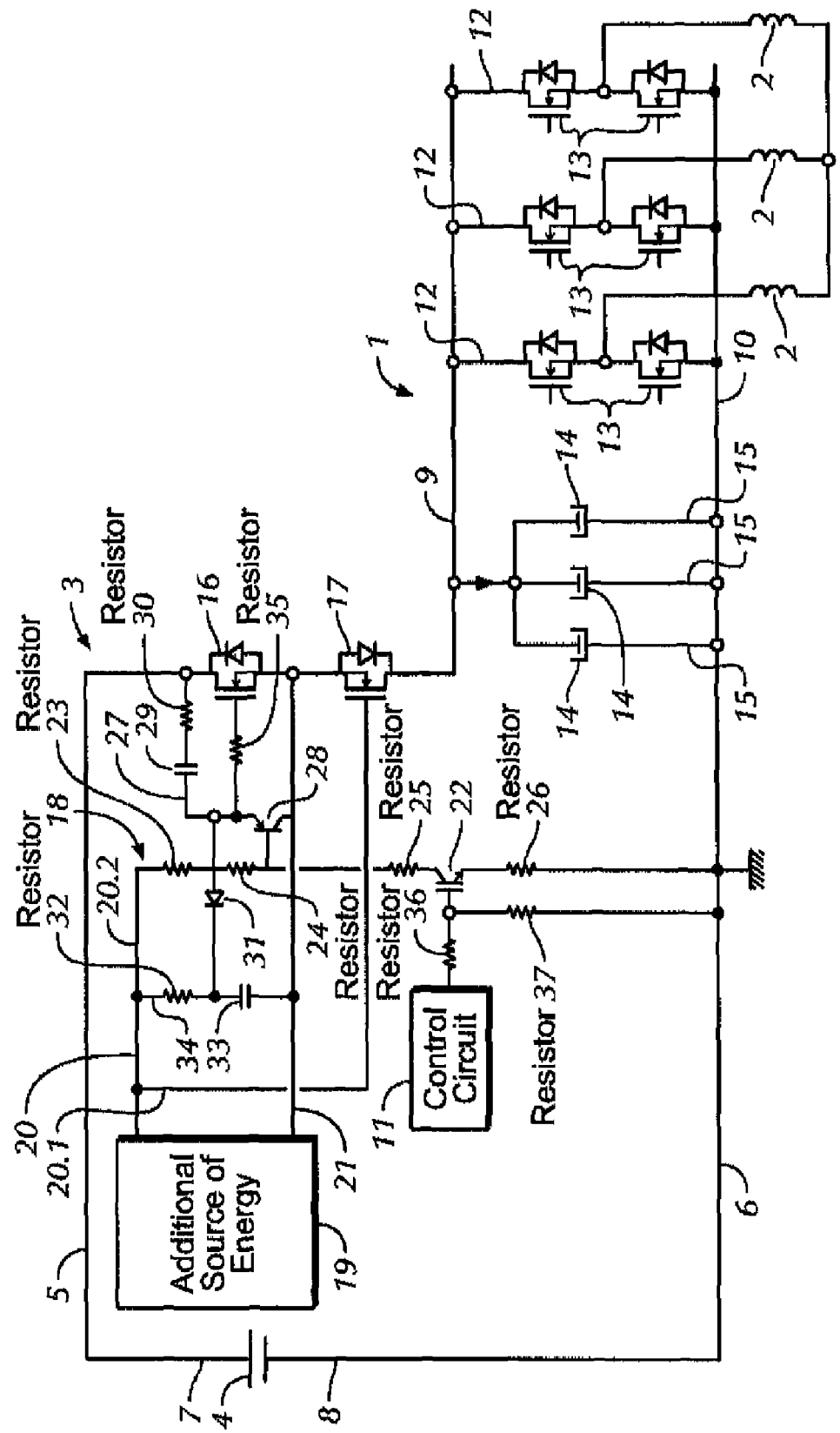

SUPPLY CIRCUIT FOR A MOTOR DISPOSING OF AN ELEMENT PROVIDING FOR POWER SWITCHING, A PROTECTION AGAINST POLARITY INVERSION AND AN ELEMENT FOR LIMITING THE INRUSH CURRENT OF A CAPACITIVE ELEMENT

The invention relates to a power supply circuit for electrical equipment and present to electrical equipment equipped with such a circuit. Such equipment is for example an electric motor designed for driving a rotating element or for assisting the movement of such an element.

BACKGROUND OF THE INVENTION

A power supply circuit for electrical equipment generally comprises a positive supply rail and a negative supply rail, each having one end connected to an energy supply device, such as a battery, and one end connected to the equipment. A capacitive filtering element is usually mounted on a secondary line with ends respectively connected to the positive rail and to the negative rail. Since each connection from the circuit to the battery may generate an inrush current that is destructive for the capacitive element, the circuit comprises a module for limiting the inrush current in order to protect the capacitive filtering element. The limiting module controls a switching device placed in the secondary line between the capacitive filtering element and the negative rail, which forms a relatively efficient solution but which has the flaw of introducing an impedance in series with the capacitive filtering element. The circuit furthermore comprises a module for protection against a polarity reversal in order to cut power to the circuit when such a polarity reversal may have consequences detrimental to the correct operation of the equipment. The protection module controls an electromechanical relay disposed on the positive rail upstream of its connection with the secondary line.

The tendency for reduction in weight and size of electrical equipment and of their associated components has a negative impact on the circuits hereinabove and the equipment which they supply such that a need is arising for more compact circuits whose performance and reliability are still at least as good.

OBJECT OF THE INVENTION

One goal of the invention is to provide a response to this need.

SUMMARY OF THE INVENTION

For this purpose, the invention provides a power supply circuit for electrical equipment, having a positive supply rail and a negative supply rail to which an inrush current limitation module and a capacitive filtering element are connected, the capacitive filtering element being mounted on a secondary line having ends respectively connected to the positive rail and to the negative rail, the circuit comprising a first n-channel MOSFET transistor and a diode mounted in series on the positive rail, the first transistor having a gate connected to the inrush current limitation module, the diode having a cathode connected to the positive rail upstream of the link from the positive rail to the secondary line.

The first transistor is controlled so as to limit the inrush current, whereas the diode provides the protection of the equipment against polarity reversals. The positioning of the first transistor upstream of the link from the positive rail to the secondary line obviates the need to introduce an impedance in series with the capacitive filtering element, thus preserving the performance of the latter, notably in compliance with the electromagnetic compatibility standards. This positioning moreover allows the losses in the inrush current limitation module to be limited. This circuit is particularly reliable and comprises a relatively small number of components.

The first transistor has, for example, a drain connected to a connecting terminal from the positive rail to a device for supplying energy, and a source connected to an anode of the diode.

Preferably, the diode is an intrinsic diode of a second n-channel MOSFET transistor having a drain connected to the positive rail upstream of the link from the positive rail to the secondary line, a source connected to the source of the first transistor and a gate connected to a control module.

Thus, the combination and the flip-flop configuration of the transistors on the positive rail allows a particularly compact circuit to be obtained. The intrinsic diode of the second transistor protects the circuit against a polarity reversal. The series configuration of the transistors furthermore allows the capacitive element and the equipment to be disconnected from the power supply source. Turning on the second transistor with the control module allows the conduction losses of the intrinsic diode and the heating of the latter that results when the polarities are not reversed to be limited. This circuit accordingly has a high efficiency.

Another subject of the invention is a system equipped with such a circuit.

Other characteristics and advantages of the invention will become apparent upon reading the description that follows of one particular non-limiting embodiment of the invention.

BRIEF DESCRIPTION OF THE DRAWINGS

Reference is made to the single appended FIGURE, showing schematically a device according to the invention.

DETAILED DESCRIPTION OF THE INVENTION

With reference to the FIGURES, the equipment according to the invention, denoted with the general reference 1, is here an electric motor comprising windings 2 connected via a power supply circuit, denoted with the general reference 3, to an energy supply device, here a battery 4.

The power supply circuit 3 comprises a positive supply rail 5 and a negative supply rail 6 each having one end 7, 8 connected to the battery 4, and one end 9, 10 connected to parallel secondary lines 12. Conventionally, two MOSFET (for "Metal Oxide Semiconductor Field Effect Transistor") transistors 13 are placed in series on each secondary line 12 and the center point between each pair of transistors 13 is connected to one of the windings 2, the gates of the transistors 13 being connected to a control circuit (not shown) for powering the windings 2 in the correct manner.

Capacitive filtering elements 14 are mounted in parallel, and upstream of the secondary lines 12, on secondary lines 15 having ends connected to the end 9 of the positive rail 5 and to the end 10 of the negative rail 6 in such a manner that the anode and the cathode of each capacitive element 14 are respectively connected to the positive rail 5 and to the negative rail 6.

According to the invention, the power supply circuit 3 comprises a first transistor 16 and a second transistor 17 placed in series on the positive rail 5. The transistors 16 and 17 are n-channel MOSFET transistors.

The transistor 16 has, for example, a drain connected to the end 7 providing the connection from the positive rail 5 to the battery 4, and a source connected to a source of the transistor 17. It furthermore has a gate connected to a control circuit denoted by the general reference 18.

The transistor 17 has a drain connected to the end 9 of the positive rail 5 and a gate connected to the control circuit 18.

The control circuit 18 comprises an additional source of energy 19, such as an additional battery or a power supply device floating with respect to the battery 4, from which runs a positive supply rail 20 having a branch 20.1 connected to the gate of the transistor 17 and a ground rail 21 connected to the centre point between the transistors 16 and 17. Here, the additional power source delivers a voltage of 12 volts referenced to the source of the transistors 16 and 17. In the case of a polarity reversal, the voltage of this additional source is zero. It will be understood that a polarity reversal at the ends 7, 8 of the power supply circuit 3 thus results in the transistor 17 being turned off, the transistor 17 being conducting when the polarities are correct.

The positive rail 20 also comprises a branch 20.2 connected to the negative rail 6 via a transistor 22 (of the npn type) whose base is connected to a control circuit shown schematically as reference 11 via a resistor 36. The transistor 22 allows the power down of the control circuit 18 to be controlled. The branch 20.2 furthermore comprises, upstream of the transistor 22, three resistors 23, 24 and 25 (resistor 25 being connected to the collector of the transistor 22) and, downstream of the transistor 22, a resistor 26 (connected to the emitter of the transistor 22 and to the negative rail 6) and a resistor 37.

The ground rail 21 is connected to the positive rail 5 at the drain of the transistor 16 via a branch 27 successively comprising, in the direction of the drain of the transistor 16, a transistor 28 (of the pnp type), a capacitor 29 and a resistor 30. The base of the transistor 28 is connected to the center point between the resistors 24, 25 and the collector of the transistor 28 is connected to the ground rail 21.

The gate of the transistor 16 is connected to the emitter of the transistor 28 via a resistor 35.

The center point between the resistors 23 and 24 is connected, on the one hand, to the branch 27 downstream of the capacitor 29 and, on the other, via a diode 31, to the center point of a resistor 32 and a capacitor 33 of a secondary line 34 connecting the branch 20.2 to the ground rail 21.

The determination of the values of the capacitors and the resistors is carried out in a manner known per se so as to control the transistor 16 in linear mode such that the transistor 16 limits the current flowing in the positive rail 5 to the load value acceptable by the capacitive filtering elements 14.

The control circuit 18 thus forms an inrush current limitation module, a module for protection against a polarity reversal arising for example in the case of an error in the battery 4 connection to the power supply circuit 3, and a power switching module allowing the disconnection of the battery from the power elements of the equipment.

It goes without saying that the invention is not limited to the embodiment described but encompasses any variant falling into the scope of the invention as defined by the claims.

As a variant, the power supply circuit may undergo modifications in order to meet particular needs of the user. Thus, the transistor 22 is optional and can therefore be eliminated when a fast shutdown of the power supply circuit is not needed. A circuit designed to detect short-circuits in the transistors 13 and to control the opening of the transistor 16 when a short-circuit is detected (and to thus protect the equipment or to avoid blowing the battery fuse if it has one) may be added to the power supply circuit. The power supply circuit can also equip systems that are insensitive to a polarity reversal or systems equipped with a dedicated relay by short-circuiting the transistor 17 with no other modification of the power supply circuit. The power supply circuit can be connected to several devices and/or comprise digital components.

The transistor 17 may be replaced by a diode having an anode connected to the source of the transistor 16 and a cathode connected to the positive rail upstream of the link from the positive rail to the secondary line.

The invention claimed is:

1. A power supply circuit for electrical equipment, comprising:
    a positive supply rail;
    a negative supply rail to which an inrush current limitation module and a capacitive filtering element are connected, wherein the capacitive filtering element is mounted on a second line having ends respectively connected to the positive rail and to the negative rail;
    a first n-channel MOSFET transistor and a diode mounted in series on the positive rail,
    wherein the first transistor has a gate connected to the inrush current limitation module, and
    wherein the diode comprises a cathode connected to the positive rail upstream of the a link from the positive rail to the secondary line,
    wherein the diode is an intrinsic diode of a second n-channel MOSFET transistor having a drain connected to the positive rail upstream of the link from the positive rail to the secondary line, and
    wherein said second transistor has a source connected to a source of the first transistor and a gate connected to a control module; and
    an additional source of energy having a positive rail with a first branch connected to the gate of the second transistor and a ground rail connected to the sources of the first transistor and of the second transistor.

2. The circuit as claimed in claim 1, in which the first transistor has a drain connected to a connecting terminal from the positive rail to a device for supplying energy and a source connected to an anode of the diode.

3. The circuit as claimed in claim 1, in which the positive rail coming from the additional source of energy comprises a second branch connected to the negative rail, and in which a branch, to which the gate of the first transistor is connected, runs between the drain of the first transistor and the ground rail and incorporates a transistor having a base connected to the second branch and a collector connected to the ground rail.

4. An electrical system incorporating a power supply circuit as claimed in claim 1.

* * * * *